United States Patent
Kaminsky et al.

(10) Patent No.: US 9,464,722 B2
(45) Date of Patent: Oct. 11, 2016

(54) PIPE SWITCH WITH METERING FUNCTION

(75) Inventors: Torben Kaminsky, Lemfoerde (DE); Horst Papenfuss, Stemwede-Haldem (DE); Christoph Bahr, Lembruch (DE); Hartmut Giesker, Bissendorf (DE); Ulrich Stich, Lembruch (DE)

(73) Assignee: BASF SE, Ludwigshafen (DE)

( * ) Notice: Subject to any disclaimer, the term of this patent is extended or adjusted under 35 U.S.C. 154(b) by 487 days.

(21) Appl. No.: 13/543,408

(22) Filed: Jul. 6, 2012

(65) Prior Publication Data
US 2013/0008543 A1    Jan. 10, 2013

Related U.S. Application Data

(60) Provisional application No. 61/505,559, filed on Jul. 8, 2011.

(51) Int. Cl.
*F16K 11/052* (2006.01)
*F16K 3/00* (2006.01)
(Continued)

(52) U.S. Cl.
CPC .............. *F16K 11/052* (2013.01); *B65G 53/56* (2013.01); *F16K 11/076* (2013.01); *Y10T 137/877* (2015.04)

(58) Field of Classification Search
CPC .. B65G 53/56; Y10T 137/877; F16K 11/052
USPC ......... 137/872, 876; 406/182, 183; 366/192, 366/193; 193/31 A
See application file for complete search history.

(56) References Cited

U.S. PATENT DOCUMENTS

| | | | | |
|---|---|---|---|---|
| 362,917 A | * | 5/1887 | Exner | 137/876 |
| 388,748 A | * | 8/1888 | Webb | 137/876 |
| 1,053,327 A | * | 2/1913 | Stebbins | 137/876 |

(Continued)

FOREIGN PATENT DOCUMENTS

| DE | 87 17 425 U1 | 11/1988 |
|---|---|---|
| DE | 40 28 582 A1 | 3/1992 |

(Continued)

OTHER PUBLICATIONS

Prof. Dr.-Ing. Dietmar Schulze, "Powder and bulk materials", © Springer-Verlag Berlin Heidelberg 2006, 6 Pages.

(Continued)

*Primary Examiner* — John Fox
*Assistant Examiner* — Seth W Mackay-Smith
(74) *Attorney, Agent, or Firm* — Oblon, McClelland, Maier & Neustadt, L.L.P (57) ABSTRACT

A pipe switch having a setting system, a housing and a closure element. The housing includes an inner wall in which a feed opening and at least two discharge openings are provided. The position of the closure element is rotatably changeable relative to the discharge openings. The setting system including a control and a drive controls the closure element such that a plurality of positions of the closure element relative to the discharge openings are realized accordingly. The closure element may be in the form of a slide or a two-part element having flaps. The setting system in cooperation with the closure system provides the plurality of positions of the closure element relative to the discharge openings, in each of which the sum of the cross-sectional areas of a first and of a second discharge opening not covered by the closure element is substantially constant.

17 Claims, 2 Drawing Sheets

(51) Int. Cl.
*F16K 11/076* (2006.01)
*B65G 53/56* (2006.01)

(56) References Cited

U.S. PATENT DOCUMENTS

| | | | | |
|---|---|---|---|---|
| 1,203,935 | A * | 11/1916 | Stringham | 137/343 |
| 1,217,938 | A * | 3/1917 | Guice | 137/874 |
| 1,681,328 | A * | 8/1928 | Erickson | 137/625.48 |
| 1,750,927 | A * | 3/1930 | Diez | 137/565.35 |
| 1,765,984 | A * | 6/1930 | Kocourek et al. | 137/599.15 |
| 1,807,085 | A * | 5/1931 | Crickmer | 137/625.47 |
| 2,436,624 | A | 2/1948 | Volk | |
| 3,365,165 | A * | 1/1968 | Gire | 251/118 |
| 3,489,178 | A * | 1/1970 | Kice | 406/183 |
| 3,545,470 | A * | 12/1970 | Paton | 137/111 |
| 3,580,540 | A * | 5/1971 | Heinen | 251/159 |
| 3,834,418 | A * | 9/1974 | Clancy | 137/625.48 |
| 4,884,594 | A * | 12/1989 | Powers et al. | 137/625.48 |
| 5,183,077 | A * | 2/1993 | Keiper | 137/625.47 |
| 5,320,141 | A * | 6/1994 | Keiper | 137/875 |
| 5,368,072 | A | 11/1994 | Cote | |
| 5,617,815 | A * | 4/1997 | Spies et al. | 123/41.1 |
| 5,741,094 | A * | 4/1998 | Heep | 406/182 |
| 6,220,793 | B1 | 4/2001 | Meyer | |
| 6,745,996 | B1 * | 6/2004 | Guthrie | 251/129.04 |
| 7,849,877 | B2 * | 12/2010 | Tan et al. | 137/625.46 |

FOREIGN PATENT DOCUMENTS

| | | |
|---|---|---|
| DE | 94 04 280 U1 | 7/1994 |
| DE | 44 03 210 A1 | 8/1995 |
| DE | 198 20 914 A1 | 11/1999 |
| DE | 10 2010 005 672 A1 | 7/2011 |
| DE | 102010005672 A1 * | 7/2011 |
| FR | 2 674 227 A1 | 9/1992 |
| JP | 55-78628 U | 5/1980 |
| JP | 7-237742 | 9/1995 |

OTHER PUBLICATIONS

International Search Report issued Sep. 6, 2012, in Patent Application No. PCT/EP2012/063260 (w/ partial English translation).

* cited by examiner

PIPE SWITCH WITH METERING FUNCTION

The invention relates to a pipe switch for the conveying, distributing and filling of bulk materials.

In order to distribute a mass flow of bulk material in a targeted manner, for example within the framework of a filling process, pipe switches are used by means of which a selection of different possible discharge locations can be made. In this connection, the pipe switch includes a housing with a feed opening and several discharge openings, a closure element or a control element being used to guide the incoming mass flow in a targeted manner. The position of the closure element is modified in order to permit, in a targeted manner, a mass flow between feed opening and a selected discharge opening, whilst other discharge openings that are not selected do not receive any mass flow.

For example, document DE 40 28 582 A1 describes a pipe switch in which a rotatable pipe arrangement connects the feed opening to a desired discharge opening. The pipe arrangement is rotatable in relation to the feed and discharge openings such that by selecting the position of the pipe arrangement in a suitable manner, a desired connection is produced by the switch. In the switch shown there are a number of individual, fixed rotary positions where the pipe arrangement aligns precisely with the corresponding openings. Consequently, using the switch shown in DE 40 28 582 A1 a selection can only be made between different discharge openings, an additional apparatus being necessary, however, for finer metering, for instance during the filling process.

Thus, if a known switch is used for filling systems, in principle a second, individual metering apparatus is necessary by way of which the filling flow can be defined in a targeted manner in order to be able to obtain a desired fill weight in a precise manner. Above all, however, the amount of space required by a layout of this type is large and in numerous applications does not exist. Consequently, these types of fill apparatuses are severely restricted with regard to the range of application.

A further disadvantage of this type of filling system is that no interruption-free metering is possible. The term interruption-free metering refers to metering methods which make it possible for the overall mass flow to remain constant during the entire filling period. In the case of the afore described combination of switch and metering apparatuses, the mass flow is temporarily interrupted at least during the change-over of a closure or control element from one discharge location to another discharge location. This means that the fill capacity of the filling system using a combination of this type is reduced. In addition, in particular in the case of adherent, sticky or heavy flowing bulk materials, i.e. in the case of not-flowing, cohesive or very cohesive bulk materials, blockages occur during the interruption.

In bulk materials handling, a bulk material is referred to as easy-flowing or free-flowing when it can be moved to flowing without any effort, for example when it flows from a container that is open at the bottom purely on account of gravity. In the case of heavy-flowing or poor flowing bulk materials, a force has to be applied or an auxiliary flow has to be used in order to enable or facilitate the flowing. For this reason, known combinations of switches and metering apparatuses are only suitable for bulk materials with a high level of flowability where an interruption in the mass flow does not result in blocking or accumulations within the filling system.

FR 2 674 227 A1 discloses a switch having a closure element and a setting system. The closure element is semi-cone shaped and is rotatable around an axis within a housing by means of the setting system in order to either close or open two discharge openings.

DE 44 03 210 A1 discloses a material flow distributor having a closure element being realized in two flaps and a setting system. The flaps are rotatable independent from each other within a housing by means of flap shafts. The flaps may open and close discharge openings.

U.S. Pat. No. 2,436,624 A discloses a switch having a closure element, which is realized as a rotatable distributer, which consists of an inclined wall portion, a vertical wall portion and a flange ring, and a setting system.

It is, consequently, the object of the invention to provide a construct suitable for filling systems, said construct making possible a larger range of applications, in particular also for not flowing, very cohesive or cohesive bulk materials.

DISCLOSURE OF THE INVENTION

This object is achieved by the pipe switch according to claim 1, the claims dependent thereon relating to preferred embodiments.

The invention relates to a pipe switch having a housing, a closure element and a setting system which includes a drive and a control. The housing includes an inner wall. A feed opening and at least two discharge openings are provided in the inner wall. The closure element is arranged within the inner wall of the housing between the feed opening and the discharge openings. The closure element is rotatably mounted in relation to the discharge openings for modifying its position. The closure element is connected to the setting system, and in particular to the drive of the setting system, so as to transmit movement. The setting system is additionally set up to modify the position of the closure element. The setting system is set up to adjust the closure element according to a plurality of different intermediate positions in relation to the discharge openings. The setting system, together with the closure element, provides that in each intermediate position the sum of the cross-sectional areas of the first and of the second discharge opening not covered by the closure element is substantially constant. Because the sum of the not covered cross-sectional areas is known in each intermediate position, this allows, contrary to the above mentioned prior art, a coarse metering as well as a fine metering as will be explained in more detail below. Thereby, the pipe switch may exactly set the metering to at least two discharge openings.

The at least two discharge openings are covered by the closure element only partially in relation to the feed opening in at least one of the intermediate positions which are provided by the pipe switch according to the invention. Preferably, the at least two discharge openings are covered by the closure element only partially in relation to the feed opening in multiple or in all intermediate positions which the pipe switch as claimed in the invention provides. The intermediate positions, in which the at least two discharge openings are covered by the closure element only partially in relation to the feed opening, can also be referred to as transition positions as they are produced during the transition from one end position to the other. The at least one or the multiple intermediate positions, in which the closure element is covered only partially in relation to the feed opening, are provided by the pipe switch as claimed in the invention, in particular by the setting system and preferably by the control or by the drive.

The setting system, and in particular the control or the drive are set up to control the at least one or the multiple intermediate positions in which the closure element covers one discharge opening or preferably two discharge openings only partially in relation to the feed opening. In addition, the closure element, by its position and connection to the setting system and in particular to the drive, is set up to control and hold the at least one or the multiple intermediate positions in which the closure element covers the at least one discharge opening only partially in relation to the feed opening.

The pipe switch is set up, in said at least one intermediate position in which the closure element covers the two discharge openings only partially in relation to the feed opening, to supply the mass flow from the feed opening to the at least two discharge openings. The mass flow coming from the feed opening is thereby apportioned to the at least two discharge openings. This makes possible continuous filling and a "flying change" between the discharge openings. In particular, it prevents the mass flow flowing through the feed opening from being temporarily interrupted. In a preferred embodiment of this aspect of the invention, the closure element extends over a circumferential distance which is shorter than the sum of the widths of the discharge openings and of the circumferential length of the inner wall between the discharge openings, in particular when the closure element is in the form of a slide. Alternative embodiments of said aspect of the invention provide that the setting system controls mass-flow-guiding components of a two-part or multi-part closure element in such a manner that in the at least one intermediate position in which the discharge openings are covered only partially, the parts of the closure element are provided at a distance from a separating element. In this connection, the mass-flow-guiding components or the parts of the two-part or multi-part closure element are realized as flaps.

The flaps can be connected or controlled in such manner that they are in parallel with each other in every position. This produces a guide mechanism which has a constant cross section and supplies the mass flow through the feed opening of the one or the other discharge opening or both discharge openings at a constant overall mass flow. This produces no blockages in the case of cohesive, very cohesive or not flowing bulk materials as the overall mass flow is not reduced in any of the positions in relation to other positions. In the case where the bulk material is an easy-flowing or free-flowing bulk material, it can be provided that the overall mass flow is restricted in relation to the maximum possible mass flow by the two flaps being open only at a certain angle to each other. To this end, the parts of the two-part or multi-part closure element are connected to separate parts of the drive. The separate parts of the drive are controlled by individual control signals, the control being set up to generate said control signals. This means that for reducing the overall mass flow, the ends of the flaps remote from the feed opening are moved towards each other. In the case of a reduction of this type produced by the flaps, a guide mechanism is produced which tapers towards the discharge openings. If, through the flowability of the bulk material, there is no risk of blockage when the overall mass flow is reduced, the overall mass flow can be adjusted in this manner. In addition, depending on the orientation of the guide mechanism defined by the two flaps, it is possible, in one end position, to direct the overall mass flow completely to one of the two discharge openings and in an intermediate position, to direct it partially into the one discharge opening and partially into the other discharge opening. The setting system and in particular the control and/or the drive are set up to adjust the flaps in parallel with each other, and, for reducing the overall mass flow, to adjust the flaps at angles to each other at which the ends of the flaps facing the feed opening are closer to each other than the ends of the flaps opposite thereto. The flaps are preferably combined with a fixed separating element which connects to at least one of the flaps in the end positions of the flaps.

With this property, in the case of free-flowing, non-adherent bulk materials, the metering switch is able to adjust the overall mass flow in relation to the maximum mass flow to the throughput capacities of fill system components which are connected downstream of the metering switch. The maximum mass flow is the mass flow where one discharge opening is completely open in relation to the feed opening.

The setting system is preferably set up to adjust the closure element in a continuous manner, it being possible to adjust a substantially infinite number of different positions. A setting system of this type is referred to as a continuous setting system. As an alternative to this, the setting system is set up to provide the closure element in a plurality of different, discrete positions.

The control of the setting system is connected to the drive to control said drive. This connection is preferably electric and the control of the setting system controls the drive by means of electric control signals. The drive serves as an actuator, preferably as a rotary actuator which is designed, in particular, as an electromechanical actuator. The drive is connected to the closure element so as to transmit movement for the positioning of said closure element. The control is preferably an electric control. The control can be a fixed-wired control or a memory programmable control, for example a control from the Simatic product range provided by Siemens AG. In addition, the control can have a microprocessor which is connected to an electronic memory in which is stored a program which is processable by the microprocessor or is processed by the microprocessor. In particular, the program has commands which also provide intermediate positions as well as the end positions.

The control can be part of an overall control, the overall control having an input for weight information generated by scales which determine the weight of a packaging unit which is filled by means of the pipe switch as claimed in the invention. In combination herewith or as an alternative hereto, the overall control can have an input for fill level information determining the fill level of a packaging unit which is filled by means of the pipe switch according to the invention.

As explained above, the setting system together with the closure element provides that in each intermediate position, the sum of the cross-sectional areas of the discharge openings not covered by the closure element is substantially constant. This means that the pipe switch can be provided with two discharge openings, i.e. with the first and the second discharge opening. A deviation of less than 20%, 10% 5% or 2% of the sum of the cross-sectional area is designated as substantially constant. In addition, the sum of the mass flows through the two discharge openings is substantially constant in each intermediate position. In this context, a deviation of less than 20%, 10%, 5% or 2% of the sum of the mass flows is designated as substantially constant. This is achieved, for example, in that when one intermediate position is changed to another one, the closure element additionally opens the one discharge opening by the amount by which, in the case of said change, the other discharge opening is closed by the closure element. In a specific embodiment, the closure element is a slide, which extends over a circumferential distance which corresponds substantially to the sum of the width of one discharge opening and the circumferential length of the inner wall between the discharge openings. The discharge openings preferably have the identical cross-sectional form and in particular the identical cross section. In a further specific embodiment, the closure element is in two parts and includes two flaps which are synchronized with each other by the flaps forming the same angle to each other in all positions by means of suitable individual control or by means of a connection. In the last-mentioned embodiment, if there is a change in position towards one discharge opening, said discharge opening is supplied additionally with the amount of mass flow by which the mass flow to the other discharge opening is reduced.

Where the closure element is designed as a slide, the cross-sectional areas which the slide does not cover are designated as cross-sectional areas and in particular as non-covered cross-sectional areas of the discharge openings. Where the closure element is designed as a multi-part or in particular two-part closure element, in particular as two flaps, those open cross-sectional areas which are between the respective flaps and a sealing element of a separating element are designated as cross-sectional areas. The cross-sectional areas preferably correspond to the open cross-sectional areas between the respective end of the flaps, opposite the axis of rotation of the flaps, and the sealing element of the separating element. In general, the cross-sectional areas can correspond to the smallest cross-sectional areas of the mass flow inside the pipe switch, the mass flow preferably being the maximum possible mass flow. In addition, to explain this aspect of the invention, a channel that extends through the pipe switch and along which the mass flow is guided can be looked at. The abovementioned cross-sectional areas are provided at the narrowest point of the channel—perpendicular to the course of the channel. The narrowest point of the channel, in the case of the closure element being designed as a slide, is the point at which the slide contacts the relevant discharge opening or discharge openings. The narrowest point of the channel, where the closure element is realized in two or more parts as flaps, is the point at which the flaps are closest. In the case of parallel flaps, this is the entire length of a channel section which is formed by the flaps. According to a further point of view, the cross-sectional areas correspond to an effective cross section, by means of which the mass flow is determined (in an exclusive manner), the effective cross section corresponding to a selective tapering of a channel otherwise not reducing the mass flow and through which the mass flow is guided. In this connection, the mass flows of the real system and of the aforementioned model are identical, and the effective cross section is based on the aforementioned simplifying model of a single, selective tapering of the cross section, which can also be regarded as an aperture shutter.

In the case of one embodiment in which flaps are used as a closure element, the mass flow can be diverted from one discharge opening to the other without a substantial reduction in the overall mass flow being produced during the diverting process. This reduces a back-up which can lead to blockages, in particular in the case of cohesive bulk materials. In addition, it is possible, by means of the intermediate positions, to reduce the mass flow into a packaging unit in a controlled and gradual manner or in a continuous manner towards the end of a filling operation of said packaging unit. This means that a target volume default can be obtained in a precise manner. At the same time, the filling operation of a further packaging unit begins through the other discharge opening so that in spite of reduction in the mass flow into the first-mentioned packaging unit, towards the end of the associated filling operation, the mass flow does not begin to falter and no back-up is formed.

The orientation of the closure element in relation to the discharge openings, in relation to the feed opening and in particular in relation to the discharge openings and the feed opening is designated as a position or intermediate position. The term "positions" includes intermediate positions and end positions. End positions, in this connection, are the positions of the closure element in which one discharge position is covered completely in relation to the feed opening and a further discharge opening is open completely in relation to the feed opening. Where pipe switches are designed with more than two discharge openings, the end positions are positions in which at least one discharge opening is covered completely by the closure element in relation to the feed opening and at least one other of the discharge openings is open completely in relation to the feed opening. Intermediate positions are positions in which one discharge opening is covered only partially or is open only partially in relation to the feed opening. In the intermediate positions, the mass flow through each of the discharge openings is preferably restricted in relation to an end position in which the discharge opening is open completely in relation to the feed opening. In an intermediate position, the mass flow or the effective diameter of the mass flow through the relevant discharge opening is greater than zero and smaller than the maximum possible mass flow which is produced in an open end position.

The advantage of the interruption-free metering made possible with the pipe switch according to the invention is that the fill capacity of the system per unit time is increased as the overall mass flow is not altered when a changeover is made between the discharge openings. In addition, the pipe switch as claimed in the invention offers the advantage that even adherent, sticky or heavy-flowing material can be filled, as the pipe switch as claimed in the invention enables an overall mass flow that is continuous in time even during the changeover between two discharge openings. The overall mass flow is the mass flow through the feed opening and also corresponds to the sum of the mass flows through the discharge openings of the pipe switch.

The pipe switch as claimed in the invention can be used for different types of bulk materials, for example for glass-like, ceramic, metal, polymeric or mineral materials. The bulk materials can, for example, be solid, hollowed, porous, resilient, deformable, loose, treated, ground or milled. The bulk material particles forming the bulk material can be present in the most varied forms, for example as bubbles, beads, powder, fine powder, granulate, fibers, flakes, blocks, balls, ellipsoids or mixtures thereof.

The pipe switch as claimed in the invention is suitable, in particular, for bulk material which tends to interlock and is heavy-flowing, for example bulk material consisting of resilient materials. The pipe switch as claimed in the invention is used in a particularly advantageous manner for bulk materials made up of granules or beads made of thermoplastic plastics material, in particular thermoplastic polyurethane. In addition, coarse-grained or fine-grained granulated materials are considered as bulk material, for example building materials such as sand, gravel, broken stone, or foodstuffs and seed material, from pellets to powdered substances such as pigments. In addition, polymeric particles are considered as bulk material, the polymerization process of which has not yet been completely concluded at least on the surface, and which consequently have cohesive properties. In addition, adhesive particles, which have a sticky surface as a natural property and consequently have adhesive properties, are considered as bulk material.

The pipe switch as claimed in the invention is suitable, in particular, for the above-mentioned bulk materials which can be cohesive or which have low flowability and are consequently not flowing, very cohesive or cohesive. The ratio between consolidation stress and compressive strength serves as a measurement for flowability. This measurement is used, for example, in "Powder and bulk materials" by Prof. Dr.-Ing. Dietmar Schulze, Springer-Verlag, 2006, to characterize flowability. According to page 42 of this publication, a ratio between consolidation stress and compressive strength of <1 corresponds to not flowing bulk material, a ratio of between 1 and 2 corresponds to very cohesive bulk material, a ratio of between 2 and 4 corresponds to cohesive bulk material, a ratio of between 4 and 10 corresponds to easy-flowing bulk material and a ratio of greater than 10 corresponds to free-flowing bulk material.

The invention makes possible, in particular, the continuous filling of not flowing, very cohesive or cohesive bulk material which, through the application of the invention, does not have to be stopped again during the fill operation once it has been made to flow.

A plurality of different intermediate positions, in which the setting system adjusts the closure element, corresponds to at least two, at least ten or at least fifty different positions. One of the discharge openings is covered only partially in the intermediate positions, different mass flows being produced by the different positions. A plurality of different intermediate positions preferably corresponds to a number of positions which allow many different restrictions on the maximum possible mass flow, the maximum mass flow occurring with a discharge opening completely open.

For example, a plurality of different intermediate positions correspond to at least ten different positions with different mass flows which are distributed, in particular, in a linear and uniform manner between 0 and 100% of the maximum mass flow. It is possible to provide 20, 50, 100 or more different intermediate positions instead of 10. In this connection, a setting system which also allows numerous further intermediate positions between the two end positions is viewed as a continuous setting system. A quasi-continuous setting system with a plurality of different intermediate positions, i.e. with at least 10, 20, 50 or 100 different intermediate positions, is also viewed as a continuous setting system. The intermediate positions are controlled in a targeted manner and do not correspond to random passes of positions between the end positions, produced when changing over from one end position to the other. Finally, the plurality of different intermediate positions can also be an infinite plurality such that the intermediate positions are modified continuously or quasi-continuously (with a plurality of intermediate positions). The intermediate positions can be represented in the form of parts of a complete opening of a discharge opening, for example as percentage coverage of a cross-sectional area of an opening, or for example by way of different angles, such that each intermediate position provides another angular value. The angle relates, in this connection, to the position, i.e. the orientation of the closure element in relation to the discharge opening and/or in relation to at least one feed opening. The drive of the setting system, in this connection, is preferably mechanical, electromechanical or pneumatic, but can also be based on other actuating techniques. The control which controls the drive is preferably electric, but mechanical or pneumatic control signals can also be output to the drive. A continuous setting system has a continuous control which is set up for controlling end positions and intermediate positions. As an alternative to this or in combination herewith, a continuous setting system can have a continuous drive which is set up to set the closure element according to end positions and intermediate positions.

The pipe switch as claimed in the invention makes it possible not only to select a specific discharge opening in relation to the feed opening, but also to meter the mass flow in a suitable manner, for example at the end or the beginning of a fill cycle. This means that two functions, namely selecting and metering, are provided by the pipe switch as claimed in the invention such that no additional metering element is necessary. Significant space is saved as a result of which, in particular, it is possible to consider applications where there is little space available for selecting and metering. Over and above this, costs are saved in a significant manner as no additional housing or components are necessary to provide the two functions. In addition, combining the metering function and the selecting function in the pipe switch as claimed in the invention simplifies the connection technique as only one single connection to the feed opening is necessary with no further interfaces to further components. Finally, it is possible to convert the invention by controlling the drive in such a manner that a continuous or quasi-continuous adjusting of the closure element is provided. This means that, with simple modification, numerous components of already obtainable switch controls can continue to be used.

In an advantageous manner, the closure element is set up to cover a first of the two discharge openings completely in a first end position, whilst the second of the two discharge openings is open at least partially in relation to the feed opening. In addition, the closure element is preferably set up to cover the second discharge opening completely in a second end position, whilst the first discharge opening is open at least partially in relation to the feed opening. In this connection, the first end position and the second end position are opposite each other. The setting system, i.e. the drive and/or the control, is or are set up to control the closure element according to the intermediate positions and according to the first or second end position. The setting system, consequently, provides a wide adjustment range which extends from the first to the second end position and also includes the intermediate positions between the first and the second end position. In this case, the setting system, and in particular the control, provides both a selecting function by the first and the second end position being able to be controlled, and a metering function or fine-metering function by it being possible to control the intermediate positions in an individual manner. In addition, the aforementioned properties of the closure element make it possible at the same time for one of the discharge openings to be covered and consequently not selected, whilst the other discharge opening is open at least partially for carrying out the metering function. This enables efficient utilization of the pipe switch during fill processes that require precise metering and where discharge openings are selected in an alternate manner.

In addition, the setting system and in particular its control can be set up to control the closure element according to multiple transition positions in relation to the discharge openings. The multiple transition positions, in this connection, form a subgroup of intermediate positions. The closure element is set up to cover both the first and the second discharge opening in a partial manner in the transition positions. This means that the mass flows can be metered through both or through multiple discharge openings at the same time, for example in order to terminate a fill process through the first discharge opening, whilst a fill process through the second discharge opening is starting, as a result of which it is possible to have fill processes and the metering thereof which overlap in time.

This means that it is possible to fill in an interruption-free manner and with an overall mass flow that is constant in time and is directed through the feed opening. As no interruptions occur in the overall mass flow, there is no risk of blocking, even in the case of cohesive, very cohesive or not flowing bulk materials.

In addition, it is preferably provided that the closure element includes a slide, the course of which follows the inner wall, either with a radial offset towards the middle of the interior, which is surrounded by the inner wall, or with no radial offset. Consequently, the course of the slide follows the inner wall with a radial offset or it follows the inner wall directly. A radial offset, for example, corresponds to an offset towards the middle of an interior which is defined by the inner wall. The slide is mounted so as to be rotatable about the middle of the interior of the inner wall. The inner wall and the slide extend along a section of a cylinder or a ball, or along another geometric rotational body. Consequently, the slide does not extend along one plane but along the inner wall which follows the rotational movement of the slide. This means that the closure element, realized in the form of a slide, can be controlled by means of a simple rotational movement. In this connection, the control can provide a rotational movement which is transmitted to the slide by means of the drive so that the rotational movement of the control flows directly into the position of the closure element, i.e. into the position of the slide. In this connection, the control provides a rotational movement by the control outputting corresponding control signals. These are then given to the drive which generates the rotational movement and passes it on to the closure element, for example to the slide.

In addition, it can be provided that the width of the slide in the circumferential direction of the inner wall is greater than the spacing between mutually facing side walls of the first and of the second discharge opening in the circumferential direction of the inner wall. The mutually facing side walls correspond to the sections of the discharge openings which are closest in the circumferential direction of the inner wall. The spacing between the mutually facing side walls can also be referred to as the inner spacing or the minimum spacing between the two discharge openings. By the width of the slide being greater than said inner spacing, the slide completely can close one of the discharge openings, whilst the other discharge opening is partially covered. This enables selection of the only partially covered discharge opening, whilst the partially covered discharge opening is reduced at the same time by the slide in a cross section according to control for carrying out the metering function.

In addition, it can be provided that the width of the slide in the circumferential direction of the inner wall is smaller than the spacing between the mutually facing side walls of the first and of the second discharge opening in the circumferential direction of the inner wall. The spacing between mutually facing side walls can also be referred to as the outer spacing or maximum spacing. Said spacing corresponds to the maximum spacing between sections of the first and of the second discharge opening along the inner wall. By the width of the slide in the circumferential direction being smaller than the outer spacing, the slide can cover one of the discharge openings completely, whilst another discharge opening is still open partially. This means that, at the same time, the partially open discharge opening can be selected and the mass flow can be metered through said discharge opening.

In addition, it can be provided that the spacing between mutually facing side walls of the first and of the second discharge opening in the circumferential direction of the inner wall is greater than the width of the first discharge opening in the circumferential direction of the inner wall and greater than the width of the second discharge opening in the circumferential direction of the inner wall. The spacing between the mutually facing side walls can also be referred to as the inner spacing and corresponds to the above-mentioned inner spacing. By the inner spacing being greater than the width of the discharge openings, one discharge opening can be covered completely, whilst another discharge opening is open partially and the mass flow is metered through the partially open discharge opening. In particular, the position for the metering of the partially open discharge opening can be modified by this measure without the completely covered discharge opening having to be opened.

In addition, it can be provided that the width of the slide in the circumferential direction is greater than the width of the feed opening in the circumferential direction of the inner wall. In this case, the cross section of the feed opening can be covered completely by the slide. The mass flow of the bulk material is consequently completely interrupted when the slide is in a blocking position, in which said slide covers the feed opening completely. In said blocking position, the filling is completely interrupted without the pipe switch filling with bulk material that could possibly become lumpy. Consequently, in the event of a fault at one of the apparatuses connected downstream of the pipe switch, rapid abortion of the bulk material flow is ensured. As the pipe switch does not receive any bulk material in the blocking position, the fill process can be resumed again without having to remove any bulk material from the pipe switch which may have blocked it. In this embodiment, the setting system is also set up to provide the aforementioned blocking position as well as the end positions and the intermediate positions and to adjust the closure element according to the blocking position.

According to a further possibility which can be seen as an alternative to the use of a slide, the closure element is realized in multiple parts and in particular in two parts. The closure element includes two or more flaps which are mounted in each case so as to rotate about an axis of rotation. The axes of rotation are preferably arranged on the inner wall, for example on both sides of the feed opening. The flaps are arranged on the inner wall on both sides of the feed opening. The pipe switch includes a fixed separating element which separates the first and the second discharge opening from each other. The separating element extends in the direction of the feed opening. In particular, the separating element extends in the direction of the feed opening from a location placed between the discharge openings. The flaps are set up to assume, in each case, a position in which they extend from the inner wall as far as up to the separating element. The position in which the flaps extend from the inner wall as far as up to the separating element corresponds to one end position. If one of the flaps assumes a position in which it extends from the inner wall as far as up to the separating element, the flap covers one of the discharge openings in relation to the feed opening. The flaps serve as a mass flow guide mechanism and, in an end position, cover at least one of the discharge openings in order, thereby, to enable selection of the discharge openings. If both flaps assume a position in which they extend towards the separating element, both discharge openings are consequently covered. This can be utilized once again in the event of a desired interruption in the mass flow if, for example, there is a fault in an apparatus connected downstream of the pipe switch. The setting system can be set up to control the flaps in such a manner that both said flaps extend towards the separating element.

The flaps are preferably flat. The respective axes of rotation of the flaps are preferably situated on or in the inner wall, in particular in the vicinity of the feed opening. The spacing between the respective axis of rotation of the flaps and the feed opening is preferably no more than 5°, no more than 10°, no more than 20°, no more than 30° or no more than 45°. The flaps are connected to the control so as to transmit rotational movement. This means that through a simple rotational movement provided by the control, the position of the flaps can be adjusted according to the desired end position or according to the desired intermediate position.

The flaps are situated in the half of the interior provided by the inner wall, facing the feed opening, whilst the discharge openings—and also the separating element—are situated in the other half of the interior. Consequently, the flaps are provided at the feed opening and are situated opposite the discharge openings. This means that in each of the intermediate positions and end positions, the flaps extend substantially towards the discharge openings, and even when a discharge opening is closed, there are no accumulating bulk material parts in the pipe switch.

The control of the two flaps of the closure element can be effected in each case by means of a separate drive. In this case, the control has two outputs which are connected individually to the two drives of the setting system. In this connection, the setting system and, in particular, the control which has two outputs, are set up to control the position of the first flap separately from the position of the second flap by means of the respective drive. The connection between the drives and the flaps is preferably provided by a mechanical connection, which transmits a rotational movement or a translatory movement. The connections between the drives and the control are preferably electrical and transmit signals according to which the position of the first and of the second flap is adjusted individually by the drives.

In addition, it can be provided that the two flaps are arranged at a fixed angle to each other by means of a mechanical connecting element. A mechanical connecting element of this type is set up to synchronize the movement of the two flaps and consequently their position. In this case, the setting system preferably has only one drive for both flaps, said drive being connected to at least one of the flaps or to said mechanical connecting element so as to transmit movement in order to modify the position of the flaps. The mechanical connecting element is set up to transmit a rotational movement or a translatory movement. As an example, the mechanical connecting element can be realized in the form of a web, which connects one point on a flap at a certain radial spacing to the axis of rotation of said flap to a corresponding point on the other flap, which is at the identical radial spacing to the axis of rotation of said other flap. Instead of a direct connection to a flap, it is also possible to use an equivalently acting lever mechanism which imitates the rotational position of the flaps, and which has a corresponding mechanical connecting element, in particular, a rod. The mechanical connecting element can consequently be provided in the form of a rod, which is connected directly or indirectly to the flaps so as to be rotatable, and which guides the flaps at a constant spacing to each other. As an alternative to this, the mechanical connecting element can also be a gearing unit which also holds the angle between the flaps constant. The first flap and the second flap are preferably in parallel with each other in position. This means that the respective angular orientations of the flaps are synchronous to each other in relation to the feed opening.

The setting system, and in particular the control, preferably has a fine metering state and a coarse metering state. The setting system is set up to assume the coarse metering state when neither of the two discharge openings is covered only partially by the closure element. The coarse metering state corresponds to an end position of the flaps and provides the selection function. The setting system is also set up to assume the fine metering state when at least one of the two discharge openings is covered only partially by the closure element. The setting system and in particular the drive or the control are set up to assume the fine dosing state and the coarse dosing state in an alternating manner. Whilst the fine dosing state corresponds to an intermediate position in which the closure element reduces (and does not block) the mass flow to a discharge opening, the coarse metering state is used for the selection of a discharge opening. The coarse metering state corresponds to a state in which the mass flow through one discharge opening is either completely blocked or is the maximum. The coarse metering state corresponds to the selecting function, whilst the fine metering state corresponds to the metering function. Since, according to the invention, the positions which are associated with the corresponding states merge into each other in a flowing manner, both states are referred to as metering states. However, one of the two functions of the pipe switch according to the invention conveys an interpretation of the coarse metering state as a selection or as a switch function, whilst the other function, i.e. metering, is carried out in the fine metering state.

It can be provided that the width of the first discharge opening in the circumferential direction of the inner wall corresponds to the width of the second discharge opening in the circumferential direction of the inner wall. This means that the two discharge openings are the same size. In particular, the cross section of the two discharge openings is identical. The two discharge openings are preferably symmetrical in relation to a plane which intersects the feed opening in a perpendicular manner and which extends through the middle of the feed opening. Said symmetrical design allows the invention to be converted in a simplified manner. In addition, this also makes possible a mass flow where deposits of bulk material are reduced.

The orientation of the first discharge opening and the orientation of the second discharge opening form an angle of no more than 60°, 50° or 45°. In this connection, the orientation of the discharge opening corresponds to the direction of the mass flow through the discharge opening and corresponds to the longitudinal course of mouths which connect to the discharge openings. In addition, it is provided that the middle of the first discharge opening is offset from the middle of the second discharge opening along the circumferential direction of the inner wall by an angle of no more than 150°, 120° or 100°. This means that the discharge openings are close together so that the position of the closure element only has to be modified slightly in order to convert the output from one discharge opening to the other discharge opening and consequently to select or change the discharge opening. Over and above this, this makes it possible to construct the pipe switch in an elongated manner and means that it can be inserted in a space-saving manner.

Typically, the discharge openings and the feed opening have a diameter of approximately 5-40 cm, 8-20 cm or 10-15 cm. Both, the housing and the closure element, are preferably made of metal, in particular steel. A disk, which covers one of the end faces of the pipe switch on which the drives are not positioned, can be produced, in particular, from a transparent material, preferably plastics material, for example polycarbonate. The end faces extend in a perpendicular manner in relation to the inner wall and cover the interior of the housing.

The pivot bearing arrangement of the closure element is preferably arranged outside the interior which is wrapped around by the inner wall. The drive can include, in particular, a solenoid, a spindle drive, a pneumatic cylinder or a pneumatic rotary drive.

The pipe switch according to the invention is preferably used for conveying and metering granulated material in the form of bulk material, in particular sticky granulated material. The pipe switch according to the invention is used, for example, to distribute granulated material, which drops out of a hopper by way of a discharge aid in free fall through a pipe between hopper and pipe switch, to one or multiple packing stations. The packing stations essentially consist of scales and optionally a structure which enables packaging units to be suspended, for example "Big-Bags". The connection between the packing stations and the pipe switch is also effected by means of pipes, through which the bulk material drops in free fall. These can be connected to the mouths of the discharge openings, if they are not used, themselves, for securing a packaging unit.

DETAILED DESCRIPTION OF THE DRAWINGS

Figure 1:
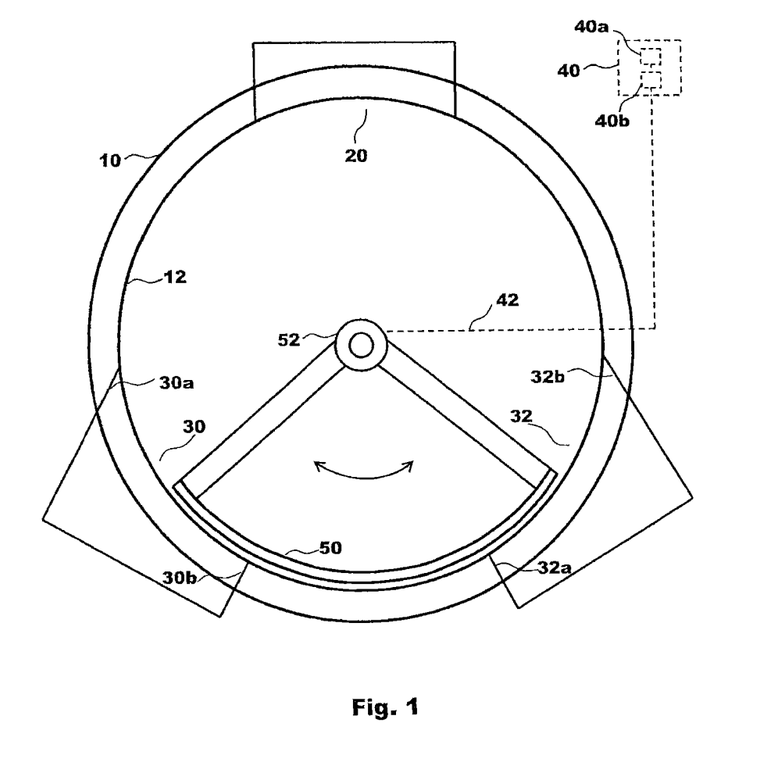
FIG. 1 shows a first embodiment of a pipe switch according to the invention.

FIG. 1 shows a first design of a pipe switch according to the invention with a cylindrical housing 10. The cylindrical housing 10 provides an inner wall 12 which has a circular cross section. The inner wall is provided with a circular cross section, in particular between the end positions of the closure element, which is described in more detail below. The pipe switch also includes a feed opening 20 and two discharge openings 30, 32 which are located opposite the feed opening. The discharge openings 30, 32 are arranged symmetrically in relation to the feed opening 20. The pipe switch shown in FIG. 1 also includes a closure element in the form of a slide 50, which follows the circular course of the inner wall 12. Between one side of the slide 50 facing the inner wall 12 and the inner wall 12 itself there is a narrow gap in order to make possible a friction-free relative movement. Said gap is preferably as small as possible. The slide 50 is connected by means of radial webs to a pivot bearing 52, which is situated in the middle of the interior being defined by the inner wall 12. By means of the pivot bearing 52, the closure element 50, realized as a slide, is mounted so as to be rotatable in its position relative to the discharge openings 30, 32. In addition, this also makes the closure element rotatably mounted in relation to the feed opening 20. It can be directly seen that said bearing arrangement makes a change in the position of the slide 50 possible in order to control the mass flow from the feed opening 20 to at least one of the discharge openings in a targeted manner and consequently to select a discharge opening and additionally to control the strength of the mass flow through said discharge opening in a continuous or quasi continuous manner.

The pipe switch shown in FIG. 1 also includes a setting system 40 which includes a control 40*a* and a drive 40*b* connected thereto. The drive 40*b* is provided for adjusting the slide 50. The setting system 40, and in particular the drive 40*b* is connected to the slide 50 by means of a connection 42. The connection 42 shown is merely shown symbolically and is preferably mechanical or transmits movement. In particular, the drive 40*b* has a mechanical output which provides a movement, the connection 42 transmitting this movement to the closure element in the form of the slide 50 in a direct or indirect manner. To this end, the connection 42 can cooperate with the closure element itself, can cooperate with webs by way of which the closure element is connected to the bearing 52, or can cooperate with components of the bearing 52 which are connected in a movement transmitting manner to the slide 50, i.e. to the closure element (by means of the webs). The drive 40*b* can be of the pneumatic or also electronic type and can transmit its movement indirectly or directly to the closure element, i.e. to the flap 50, by means of the connection 42. The pipe switch shown in FIG. 1, and in particular the setting system 40 or the control 40*a* and/or the drive 40*b* is set up to control the closure element according to multiple intermediate positions. The closure element assumes the intermediate position through this control. In the position shown in FIG. 1, the closure element 50, realized as a slide, covers both discharge openings, i.e. the first discharge opening 30 and the second discharge opening 32 only partially such that the mass flow is restricted in relation to a maximum possible mass flow with the discharge opening open completely.

The first discharge opening 30 provides a side wall 30*a* shown on the left-hand side in FIG. 1 and a right-hand side wall 30*b*, whilst the right-hand second discharge opening has a left-hand side wall 32*a* and a right-hand side wall 32*b*. The side walls extend as far as up to the inner wall 12 and in each case form part of a mouth which continues the respective discharge opening 30, 32 from the inner wall 12 towards the outside. The right-hand side wall 30*b* of the left-hand discharge opening 30 and the left-hand side wall 32*a* of the right-hand discharge opening 32 form side walls that face each other. Between said side walls there is an inner spacing which is also referred to as the minimum spacing. In a comparable manner, the left-hand side wall 30*a* of the first discharge opening 30, shown on the left, and the right-hand side wall 32*b* of the second discharge opening 32 shown on the right form side walls that are remote from each other. Between the two aforementioned side walls there is an outer spacing which is also referred to as the maximum spacing. The mouths can be cylindrical. In this case, the left-hand and the right-hand side walls are reduced to corresponding side lines. These extend along the longitudinal course of the mouths.

The slide 50 extends at least over the depth of the discharge openings in a direction perpendicular to the drawing plane such that the slide 50 covers one discharge opening completely when the slide 50 is situated over the discharge opening 30.

The pivot bearing 52 makes possible a movement in the direction of the double arrow shown in FIG. 1 about the axis of the pivot bearing 52.

It can be seen by way of FIG. 1 that the pipe switch shown here includes only the first and the second discharge openings 30, 32 as discharge openings. In addition, it is directly apparent that in the position shown, the closure element covers the first and the second discharge opening only partially. The setting system 40, together with the closure element 50, provides that in each intermediate position or in a plurality of intermediate positions, the sum of the cross-sectional areas of the first and of the second discharge opening not covered by the closure element is substantially constant. The closure element 50 extends over a circumferential distance which corresponds to the sum of a width of one of the discharge openings and the inner spacing between the two discharge openings. As an alternative, the closure element 50 can extend over a greater circumferential distance. The discharge openings 30, 32 and the closure element 50 are set up, in particular by the respective circumferential extension and by the reciprocal spacing, such that when there is a change from one intermediate position to another, the one discharge opening is opened further by the closure element 50 by the amount by which the other of the two discharge openings is closed by the closure element 50. In all intermediate positions or in a plurality of intermediate positions, the sum of the cross sections by which the closure element leaves the discharge openings open is substantially constant.

Figure 2:
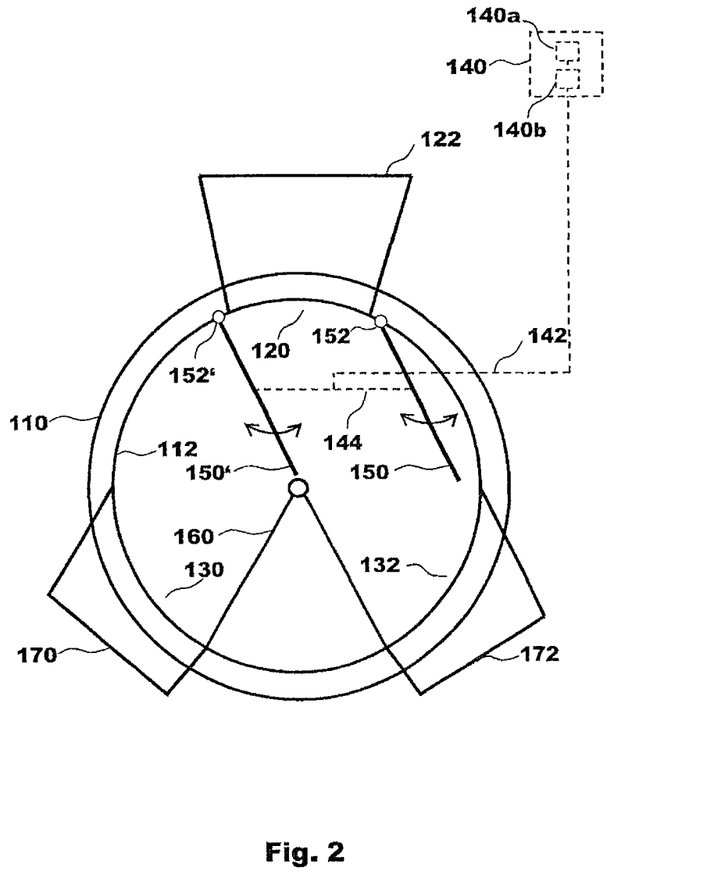
FIG. 2 shows a second embodiment of the pipe switch according to the invention.

FIG. 2 shows a second embodiment of a pipe switch according to the invention. The pipe switch shown in FIG. 2 includes a housing 110 which provides a cylindrical interior. An inner wall 112 of the housing 110 consequently has a circular cross section. The pipe switch also includes a feed opening 120 and a first discharge opening and a second discharge opening 130, 132. The discharge openings 130, 132 are located opposite the feed opening 120. The pipe switch in FIG. 2 also includes a two-part closure element in the form of two flaps 150, 150' which are arranged on the inner wall 112 on respective pivot bearings 152, 152' offset to the feed opening 120. The flaps 150, 150' are pivotable on account of the pivot bearing 152, 152', respectively, according to the double arrows shown in FIG. 2. A fixed separating element 160 extends from the discharge openings 130, 132 into the interior of the housing 110, in particular as far as up to the middle of the interior, which is surrounded by the inner wall 112. The length of the flaps 150, 150' corresponds substantially to the diameter of the interior, minus the radial length of the separating element. In FIG. 2, the separating element extends from the inner wall 112 as far as up to the middle and consequently has a length which corresponds to the radius of the circular interior. In the same way, the flaps 150, 150' have a length which corresponds to the radius of the circular interior of the housing 110 which is bounded by the inner wall 112. If, consequently, one of the flaps is in the closed position, i.e. in a position in which the flap 150' extends as far as up to the separating element 160, then that discharge opening 130 which is situated on the side of the flap 150' is blocked. The flap 150' consequently blocks a mass flow from the feed opening 120 towards the feed opening 130, and simply enables a mass flow from the feed opening 120 as far as up to the second discharge opening 132. FIG. 2 shows the closure element, realized by the two flaps 150, 150', in an end position in which a mass flow from the feed opening 120 is supplied unreduced to the second discharge opening 132, shown on the right-hand side, whilst the first discharge opening 130 receives no mass flow. The pipe switch is set up to provide the flaps 150, 150' in an intermediate position in which, for example, a reduced mass flow is output to one of the discharge openings 130, 132. This means that the mass flow can be metered through said discharge openings, whilst at the same time the discharge opening is selected.

To this end, the setting system 140, and in particular a drive 140b of the setting system 140 is connected by means of a connection 142 to a mechanical connecting element 144, which connects the two flaps 150, 150' to each other at a fixed angle. In particular, the setting system 140 includes a control 140a which is connected in a controlling manner to a drive 140b of the setting system 140. In this connection, the drive or its mechanical output is connected by means of the mechanically provided connection 142 to the mechanical connecting element 144 which connects the two flaps 150, 150' to each other. The mechanical connecting element 144 is set up to synchronize the flaps 150, 150' with each other, i.e. to provide them at a fixed angle to each other. The flaps 150, 150' are uniformly controlled by the mechanical connecting element 144 and remain in parallel with each other irrespective of the position.

The separating element 160 is terminated towards the middle by way of a cylindrical sealing element, the sealing flaps 150, 150' and the pivot bearings 152, 152' being arranged such that one of the flaps closes off with the separating element 160 in an end position. In the same way, the lengths and the arrangements of the flaps are provided in such a manner that the ends of the flaps are able to move past the separating element 160 or at least will not be clamped. In a further embodiment (not shown), the length of the flaps together with the length of the separating element is greater than the diameter of the interior of the housing 110 so that the ends of the flaps abut against the separating element 160 in their end position. The separating element 160 in FIG. 2 has two bases which are diametrically opposite the locations of the pivot bearings 152, 152' of the flaps 150, 150'.

The pipe switch shown in FIG. 2 has a feed opening 120, to which is connected a mouth 122 which extends away from the housing 110. The cross section of the mouth widens in a direction which leads radially away from the housing 110. In each case mouths 170, 172 also connect to the discharge openings 130, 132', said mouths extending away from the housing 110 and tapering in said direction of extension. In a preferred alternative to a design in FIG. 2, the mouths have a constant cross section and extend straight. The mouths, according to the preferred alternative, have a cylindrical, preferably circular cylindrical shape.

In a further alternative embodiment which has a flap as closure element and a separating element as the separating element 160, the pivot bearing of the flap is arranged on a cylindrical sealing element of the separating element. The end of the flap placed away from the pivot bearing is consequently capable of passing over a circumferential section which includes the feed opening of the pipe switch. Depending on the position of the flap, consequently, the mass flow is supplied partially through the feed opening in the end positions of the one or the other discharge opening or in intermediate positions of the two discharge openings. In this case, the flap has a thickness that is negligible in relation to the width of the feed opening in order not to generate any back-up on the radial outer end face of the flap in intermediate positions. The thickness is less than 15%, 10%, 5% or 2% of the width of the feed opening and, in particular, is not greater than 3 mm, 2 mm, 1.5 mm, 1 mm or 0.7 mm. Where the thickness is constant, the profile of the flap in the direction of the axis of rotation can be a rectangle.

It is also possible for the thickness of the flap not to be constant and, for example, to reduce preferably in a continuous manner from the axis of rotation. In particular, the profile of the flap in the direction of the axis of rotation can be a symmetrical trapeze. As an alternative to this, the thickness can be constant. The course of the flap can be linear or can follow an arc. In particular, the course of one of the flaps can be curved towards the other flap. In the case where the flap has a trapezoidal profile, it is possible for the portions of the trapeze not to be straight but to be curved in a concave manner.

The flap can have a thickness of 20 mm, 10 mm, 5 mm, 2.5 mm or 1 mm at the axis of rotation and on the opposite side can have a lesser thickness of 3 mm, 2 mm, 1.5 mm, 1 mm or 0.7 mm.

The aforementioned properties can be the properties of one flap, of multiple flaps or of all flaps of the pipe switch.

A gap can be provided between the closure element and end faces of the pipe switch which extend in a perpendicular manner in relation to the inner wall. The size of said gap is a maximum of 1.5 mm, 1 mm or 0.5 mm.

LIST OF REFERENCES 10, 110 Housing
12, 112 Inner wall
20, 120 Feed opening
122 Mouth of the feed opening
30, 32, 130, 132 Discharge openings
30a,b; 32a, b Side walls of the mouths of the discharge openings
40, 140 Setting system
40a, 140a Control
40b, 140b Drive
42, 142 Connection
144 Mechanical connecting element
50 Slide
150, 150' Flaps
52, 152, 152' Pivot bearing
160 Separating element
170, 172 Mouths of the discharge openings

We claim:

1. A pipe switch for conveying, distributing and filling of bulk materials, the pipe switch comprising:
a housing that includes an inner wall in which a feed opening and at least two discharge openings are provided, the two discharge openings being located opposite the feed opening with respect to a circumferential direction of the inner wall such that the two discharge openings are symmetrical in relation to a first plane, the first plane intersecting the feed opening in a perpendicular manner with respect to a second plane extending perpendicular to side walls of the feed opening, and the first plane extending through a middle of the feed opening along a longitudinal direction of the feed opening;
a setting system which includes a control and a drive; and
a closure element arranged within the inner wall of the housing between the feed opening and the at least two discharge openings, the closure element further including a slide or the closure element being realized in two parts and including two flaps, the closure element being rotatably mounted in relation to the discharge openings for modifying its position,
wherein the setting system is connected to the closure element so as to transmit movement and being set up to modify the position of the closure element,
wherein the setting system is set up to control and hold the closure element in a plurality of different intermediate positions in relation to the at least two discharge openings, each of the at least two discharge openings being covered by the closure element only partially in relation to the feed opening in at least one of the intermediate positions,
wherein the setting system, together with the closure element, provides that in each intermediate position the sum of the cross-sectional areas of the first and of the second discharge openings not covered by the closure element is substantially constant,
wherein the slide follows the inner wall with a radial offset or the course of which follows the inner wall directly, and which is mounted so as to be rotatable about the middle of the interior of the inner wall, the inner wall and the slide extending along a section of a cylinder or a ball,
wherein a minimum spacing between immediately adjacent mutually facing side walls of the first and of the second discharge openings, the mutually facing side walls being the closest side walls to each other in the circumferential direction of the inner wall, is greater than a width of the first discharge opening in the circumferential direction of the inner wall and greater than a width of the second discharge opening in the circumferential direction of the inner wall, and
wherein the setting system has a fine metering state and a coarse metering state, the setting system being set up to assume the coarse metering state when neither of the two discharge openings is covered only partially by the closure element, and the setting system being set up to assume the fine metering state when at least one of the two discharge openings is covered only partially by the closure element.

2. The pipe switch according to claim 1, wherein the closure element is set up to cover a first of the two discharge openings completely in a first end position, whilst a second of the two discharge openings is open in relation to the feed opening, and in a second end position which is opposite the first end position, to cover the second discharge opening completely whilst the first discharge opening is open in relation to the feed opening, the setting system being set up to control the closure element according to the intermediate positions and according to the first and the second end position.

3. The pipe switch according to claim 1, wherein the setting system is set up to control the closure element according to multiple transition positions, which form a subgroup of the intermediate positions, in relation to the discharge openings the closure element being set up to cover both the first and the second discharge openings partially in the transition positions.

4. The pipe switch according to claim 1, wherein a width of the slide in the circumferential direction of the inner wall is greater than the minimum spacing between mutually facing side walls of the first and of the second discharge openings being closest to each other in the circumferential direction of the inner wall.

5. The pipe switch according to claim 4, wherein the width of the slide in the circumferential direction of the inner wall is smaller than a maximum spacing between side walls of the first and of the second discharge openings being remote from each other in the circumferential direction of the inner wall.

6. The pipe switch according to claim 1, wherein two flaps are mounted in each case so as to be rotatable about an axis of rotation, which flaps are arranged on both sides of the feed opening on the inner wall, the pipe switch including a fixed separating element which separates the first and the second discharge opening from each othtr and extends in the direction of the feed opening, and the flaps being set up in each case to assume a position in which they extend from the inner wall as fir as up to the separating element.

7. The pipe switch according to claim 6, wherein the setting system is connected to the two flaps of the closure element by means of separate drives or separate parts of the drive and is set up to control the position of the first flap separately from the position of the second flap, or wherein the two flaps are arranged at a fixed angle to each other by means of a mechanical connecting element and the setting system is connected to at least one of the flaps or to said mechanical connecting element so as to transmit movement for modifying the position of the flaps.

8. The pipe switch according to claim 1, wherein the width of the first discharge opening in the circumferential direction of the inner wall corresponds to the width of the second discharge opening in the circumferential direction of the inner wall.

9. The pipe switch according to claim 1, wherein the orientation of a mouth of the first discharge opening, which points away from the housing, and the orientation of a mouth of the second discharge opening, which points away from the housing, form an angle of no more than 60° and the middle of the first discharge opening is offset from the middle of the second discharge opening along the circumferential direction of the inner wall about an angle of not more than 150°.

10. The pipe switch according to claim 1, wherein the orientation of a mouth of the first discharge opening, which points away from the housing, and the orientation of a mouth of the second discharge opening, which points away from the housing, form an angle of no more than 50°, and the middle of the first discharge opening is offset from the middle of the second discharge opening along the circumferential direction of the inner wall about an angle of not more than 120°.

11. The pipe switch according to claim 1, wherein the orientation of a mouth of the first discharge opening, which points away from the housing, and the orientation of a mouth of the second discharge opening, which points away from the housing, form an angle of no more than 45° and the middle of the first discharge opening is offset from the middle of the second discharge opening along the circumferential direction of the inner wall about an angle of not more than 100°.

12. A filling system that comprises the pipe switch according to claim 1.

13. The filling system of claim 12, wherein said pipe switch enables an overall mass flow that is continuous in time even during a changeover between two discharge openings.

14. A method for filling a bulk material comprising feeding a free-flowing bulk material into the filling system of claim 12 and discharging it from said system.

15. The method of claim 14, wherein the bulk material is a glass-like, ceramic, metal, polymeric or mineral material.

16. The method of claim 14, wherein the bulk material is heavy-flowing, adherent, cohesive or has low flowability.

17. The method for filling a bulk material according to claim 14, further comprising interruption-free metering flow of the bulk material.

* * * * *